(12) United States Patent
Marioni

(10) Patent No.: US 6,861,819 B2
(45) Date of Patent: Mar. 1, 2005

(54) ELECTRONIC DEVICE FOR STARTING A PERMANENT-MAGNET SYNCHRONOUS MOTOR

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 0 days.

(21) Appl. No.: 10/382,015

(22) Filed: Mar. 5, 2003

(65) Prior Publication Data

US 2004/0145336 A1 Jul. 29, 2004

(30) Foreign Application Priority Data

Mar. 5, 2002 (EP) .............................. 02425122

(51) Int. Cl.⁷ ................................. H02P 5/28
(52) U.S. Cl. ................. 318/721; 318/700; 318/254; 318/138; 318/439
(58) Field of Search ............... 318/700, 721, 318/254, 138, 439

(56) References Cited

U.S. PATENT DOCUMENTS

| 4,698,562 | A | * | 10/1987 | Gale et al. .................. 318/254 |
| 5,434,491 | A | * | 7/1995 | Marioni ....................... 318/700 |
| 5,608,300 | A | * | 3/1997 | Kawabata et al. .......... 318/721 |
| 5,675,226 | A | | 10/1997 | Riola |
| 6,034,493 | A | * | 3/2000 | Boyd et al. .................. 318/254 |
| 6,121,736 | A | * | 9/2000 | Narazaki et al. ............ 318/254 |
| 6,188,196 | B1 | * | 2/2001 | Koide et al. ................. 318/700 |
| 6,236,179 | B1 | * | 5/2001 | Lawler et al. .............. 318/439 |
| 6,392,418 | B1 | * | 5/2002 | Mir et al. .................... 324/503 |

FOREIGN PATENT DOCUMENTS

EP 0 574 823 A2 12/1993

\* cited by examiner

*Primary Examiner*—Rita Leykin
(74) *Attorney, Agent, or Firm*—Akerman Senterfitt

(57) ABSTRACT

An electronic device for starting a permanent-magnet synchronous motor, comprising logic control means, at least one switch arranged in series between a power supply source and a permanent-magnet synchronous motor, sensor means suitable to determine the polarity and position of the rotor of the motor, the logic control means being suitable to send a driving signal to the switch means as a function of a signal that arrives from the sensor means and a voltage signal of the power supply source.

21 Claims, 3 Drawing Sheets

ELECTRONIC DEVICE FOR STARTING A PERMANENT-MAGNET SYNCHRONOUS MOTOR

The present invention relates to an electronic device for starting a permanent-magnet synchronous motor.

It is known that a permanent-magnet synchronous motor, particularly in its single-phase embodiment with a tuning fork-like stator and a permanent-magnet rotor, has considerable problems during starting, owing to the fact that the rotor passes from a condition in which its speed is zero to a condition in which it is frequency-locked with the electric power supply source.

For example, if the power supply source frequency is 50 or 60 Hz, the rotor should attain synchronous speed in a time equal to one half-period. However, this is very troublesome, especially when the rotor has a significant moment of inertia and the contrast torque of the applied load is nonzero.

In order to overcome all these limitations, various solutions using electronic circuits for this purpose have been devised; in particular, EP-O574823, by the same Applicant, discloses an electronic device for starting a permanent-magnet synchronous motor whose particularity is that it is particularly simple and can be manufactured at low cost.

Said patent describes how the electronic device for starting the permanent-magnet synchronous motor detects the position of the rotor by means of an appropriately provided sensor, assisted by the control circuit logic system, which by controlling a static switch, such as for example a triac, decides whether to supply power or not to the stator winding depending on the polarity of the power supply source voltage at a given instant, thus generating a stator magnetic flux. This flux, by interacting in the magnetic field generated by the rotor, produces a torque that is capable of accelerating the rotor in a specific direction of rotation until the synchronous speed typical of the external electrical power source, for example 50 or 60 Hz, is reached and maintained.

The above cited patent teaches that in order to always have the condition of maximum torque during the starting transient and therefore have the minimum rotor synchronization time, the rotor position signal must be processed in an appropriately provided circuit block in order to adapt, by varying the timing, the switching to the conducting mode of the triac that supplies power to the stator coil to the phase shift that occurs between the external source power supply voltage and the current that circulates in the coil, which has the same phase as the stator magnetic flux.

The circuit block that determines this phase shift is known as phase-shift network.

The absence of the phase-shift network allows to operate the static switch (for example the triac) only when theoretical conditions, i.e., position of the rotor and voltage of the power supply network, occur, but not when real conditions, i.e., position of the rotor and current circulating in the stator coil, occur.

The direct consequence of this is the generation of peak torques that contrast the rotation of the rotor and of torques having a lower average value in the half-period and the period, with reference to the voltage of the electric power supply source.

Accordingly, the starting transient of the motor is compromised for high contrasting loads. The phase shift network therefore has the task of ensuring the maximum torque available at the motor shaft during the starting transient, further allowing the coupling of the motor to contrasting loads that are on average higher during synchronization.

However, the above described solution, which is the subject matter of the aforesaid patent, while being advantageous as regards efficiency, has drawbacks and limitations, which are mainly due to the fact that the phase shift network is provided by means of standard-class, i.e., low-cost, commercial passive electronic components, in which manufacturing tolerances related to nominal performance parameters are inevitably altered further by the industrial assembly process, whose combination determines, for certain applications of the permanent-magnet synchronous motor, an operating range that is so narrow as to force the use of electronic components of a higher class and cost. This of course leads to the loss or reduction of the financial benefits sought with the device according to the aforesaid patent. Moreover, the same electronic components are subjected, during their life and as a consequence of temperature variations, to drifts from their nominal values that further limit the usable production range.

The aim of the present invention is to provide an electronic device for starting a permanent-magnet synchronous motor that minimizes the drawbacks caused by the tolerance of the electronic components used in the motor starting and control circuit.

Within this aim, an object of the present invention is to provide an electronic device for starting a permanent-magnet synchronous motor that is stable over time and scarcely sensitive to operating temperature variations.

Another object of the present invention is to provide an electronic device for starting a permanent-magnet synchronous motor that allows to eliminate the phase shift network provided by means of analog electronic components, thus reducing the final cost of the device.

Another object of the present invention is to provide an electronic device for starting a permanent-magnet synchronous motor in which the overall number of components of the circuit is reduced.

Another object of the present invention is to provide an electronic device for starting a permanent-magnet synchronous motor that is highly reliable, relatively simple to manufacture and at competitive costs.

This aim and these and other objects that will become better apparent hereinafter are achieved by an electronic device for starting a permanent magnet synchronous motor including a stator having a central axis and a permanent-magnet rotor having a reference axis separating the north from the south pole, and comprising logic control means, at least one switch arranged in series between a power supply source and a permanent-magnet synchronous motor, sensor means suitable to determine the polarity and position of the rotor of said motor, wherein said logic control means are suitable to send a driving signal to said switch means as a function of a signal that arrives from said sensor means and a voltage signal of said power supply source.

Further features and advantages of the invention will become better apparent from the description of an embodiment of the starting device according to the present invention, illustrated only by way of non-limitative example in the accompanying drawings, wherein.

Figure 1:
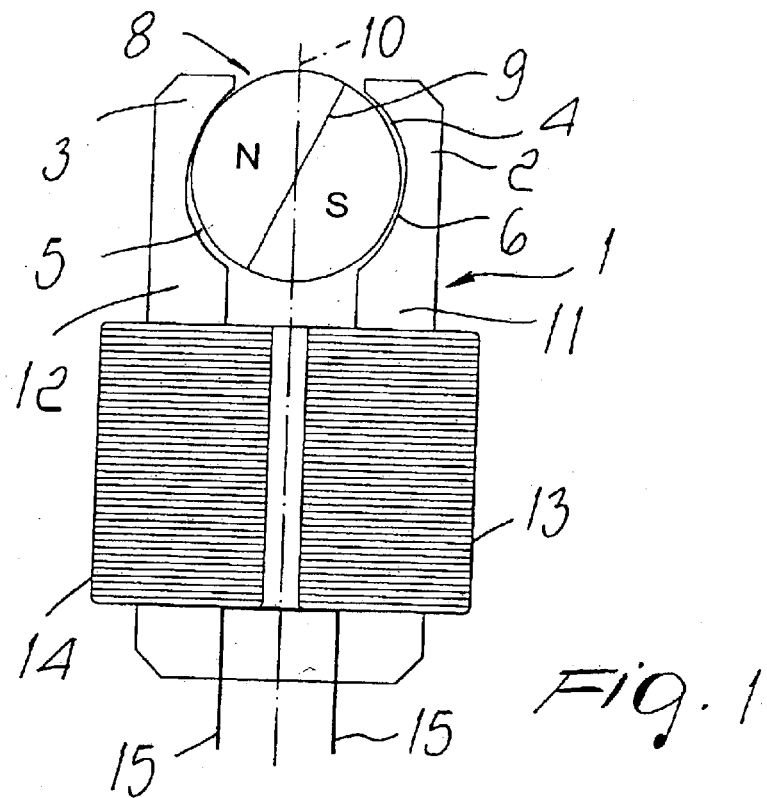
FIG. 1 is a schematic view of a permanent-magnet synchronous motor suitable to be started with a device according to the present invention.

With reference to the figures, the synchronous motor with which the starting device according to the present invention can be associated is composed of a stator pack 1 provided with two unbalanced poles with an asymmetrical gap 4, 5, 6, 7.

In this configuration, the rotor arranges its reference axis 9, which ideally separates the north from the south, in a position that does not coincide with the central axis 10, as would occur if the stator poles w ere perfectly symmetrical, so as to tilt the axis 9 by a certain angle in order to facilitate the unidirectionality of the rotor during starting.

Excitation coils 13 and 14 are respectively inserted in the extensions of the stator pack and are connected in series, by means of terminals 15, to the AC power supply source.

Figure 3:
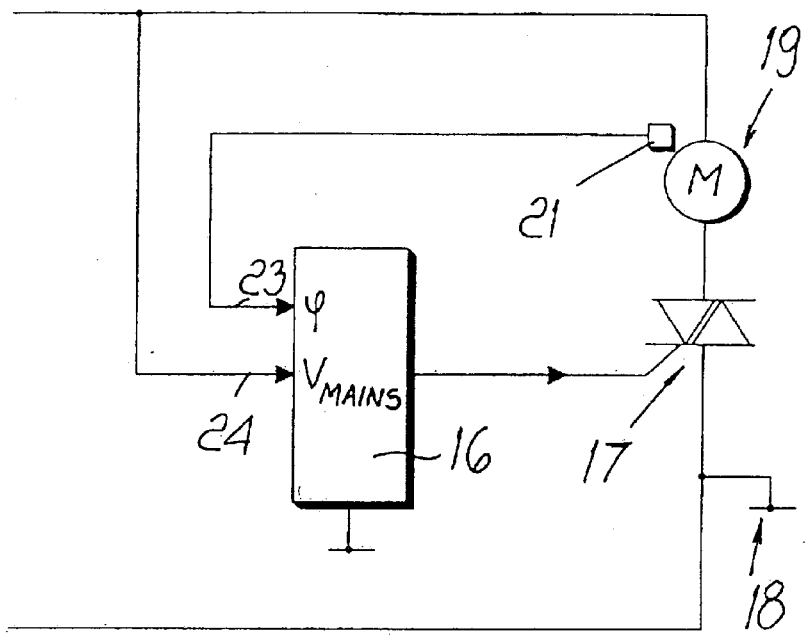
FIG. 3 is a block diagram of the starting device according to the present invention.

The electronic power supply circuit is shown schematically in the block diagram of FIG. 3 and is composed of logic control means 16 for a static power switch, for example a triac, which are arranged in series between the AC power supply source 18 and the permanent-magnet synchronous motor.

Sensor means 21 determine the polarity and position of the permanent-magnet rotor of the synchronous motor 19 when it is rotating or stuck or in the idle condition in which its speed is zero.

The output signal of the sensor means 21 enters the logic control means 16 by means of an input 23, while a second signal that enters the logic control means 16 is represented by the voltage of the electric power supply source, input 24.

The logic control means 16 comprise a discrete or programmable logic circuit which, after performing digital conversion of the analog signals 23 and 24 that arrive respectively from the sensor means 21 and from the power supply source, determines, by means of an appropriate signal, the opening or closure of the static switch 17 connected in series to the motor 19.

The signal that arrives from the sensor means 21, which conveniently can be of the Hall-effect type, enters the logic control means 16 by means of the input 23 and is processed without introducing any phase variation that delays or advances its relative position with respect to the voltage or current zero-crossing points.

Figure 4:
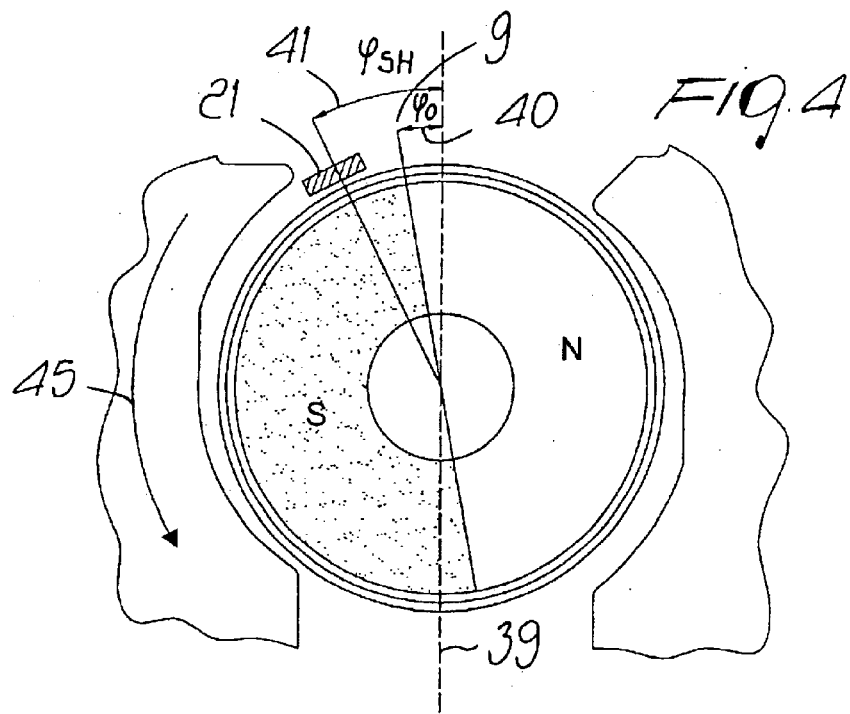
FIG. 4 is a view of the inactive position of the rotor with reference to the central axis of the stator.

FIG. 4 illustrates the arrangement of the sensor means 21. In the case shown in FIGS. 4, 5 and 6, purely as a convention, it is assumed that the logic control means 16 enable the stator current by means of the static switch 17, so as to generate a magnetic field that favors a counterclockwise rotation of the rotor (indicated by the arrow 45) only if the sensor means 21 face the south pole of the permanent-magnet rotor.

Figure 5:
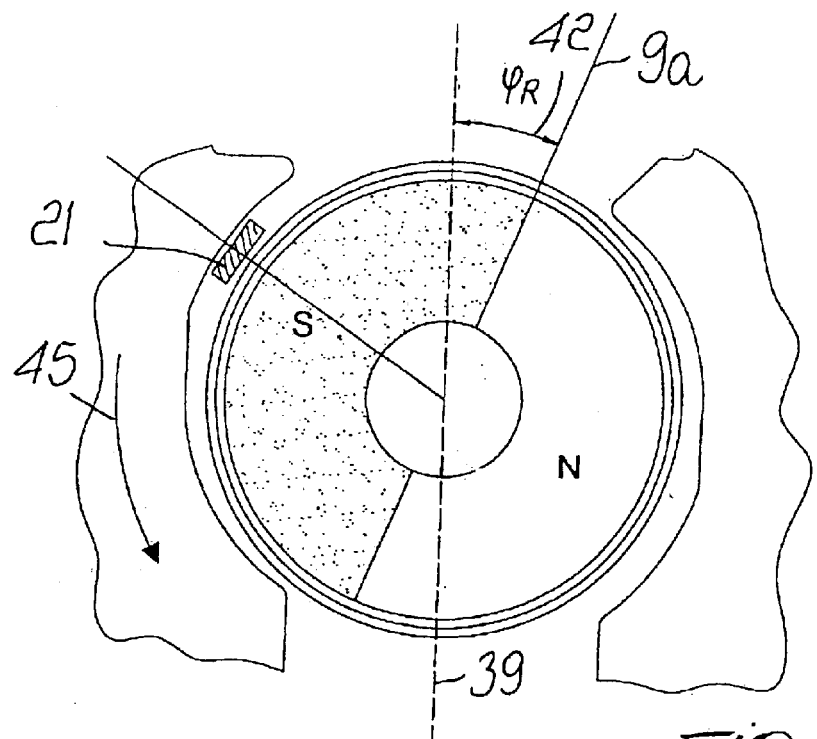
FIG. 5 is a view of the position of the rotor in a different situation in which correct rotation and zero-crossing of the voltage of the power supply source occur.
Figure 6:
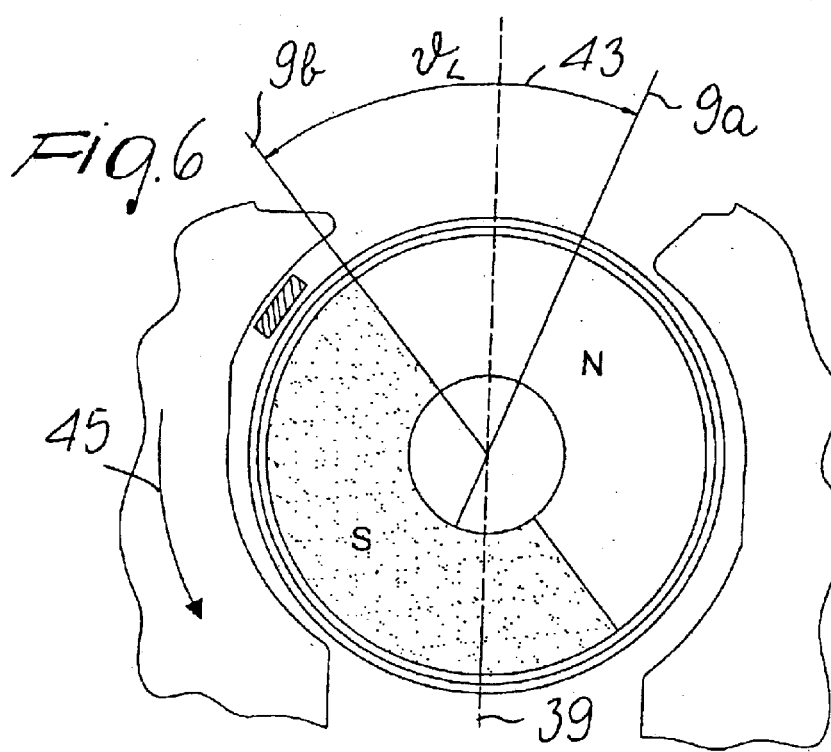
FIG. 6 is a view of the position of the rotor in a condition in which correct direction of rotation and zero-crossing of the current that circulates in the stator coils occur.

A reference axis 39 is thus defined which represents the central axis of the stator, and the following angles are also defined and are considered positive when the arc between the axis 39 and the angular position of the sensor means 21 is clockwise, with FIGS. 4,5, and 6 as reference:

$\Phi_0$=angle of the rotor at rest, designated by the reference numeral 40

$\Phi_{SH}$=position of the Hall sensor, designated by the reference numeral 41

$\Phi_R$=rotor phase shift at voltage zero crossing, designated by the reference numeral 42

$\theta_L$=phase shift between the voltage of the external power supply source and the current that circulates in the stator coils, termed load angle and designated by the reference numeral 43.

FIG. 6 also shows, and designates with the reference numeral 43, the phase shift $\theta_L$ between the voltage of the external power supply source and the current that circulates in the stator coils, which is calculated as the angle between the axis 9b, which represents the position of the axis 9 at current zero-crossing time, and the axis 9a, which represents the position of the axis 9 at voltage zero-crossing time, shown by way of example in FIG. 5.

The following mathematical values are then defined:

Static phase margin $\Phi_{MO}$: angle between the position of the sensor and the axis of the magnet at rest $$\Phi_{MO}=\Phi_{SH}-\Phi_0 \qquad \text{A)}$$

Phase margin far correct rotation $\Phi_{Mc}$ at current zero-crossing $$\Phi_{Mc}=\Phi_{SH}-\Phi_R+\theta_L \qquad \text{B)}$$

In the starting and synchronization conditions represented so far, the static phase margin and the correct rotation phase margin should have the highest possible absolute value; in this case, a positive one.

The phase shift angle $\theta$ depends on the speed of the rotor and on the load applied to the motor.

The particularity of the invention is that values of the angle at rest of the rotor $\Phi_0$ and of the position of the sensor means $\Phi_{SH}$ are set which, owing to the absence of a phase shift network and to the uniqueness of the position of the sensor means 21 $\Phi_{SH}$, determine equations A and B univocally.

Equation B teaches that there is an optimum value of the position of the sensor means 21, $\Phi_{SH}$, which depends on the angle $\theta_L$, which in the absence of phase shift is determined solely by the applied load and is capable of optimizing to the maximum possible level the coupling between the permanent-magnet synchronous motor 19 and the applied load.

Figure 2:
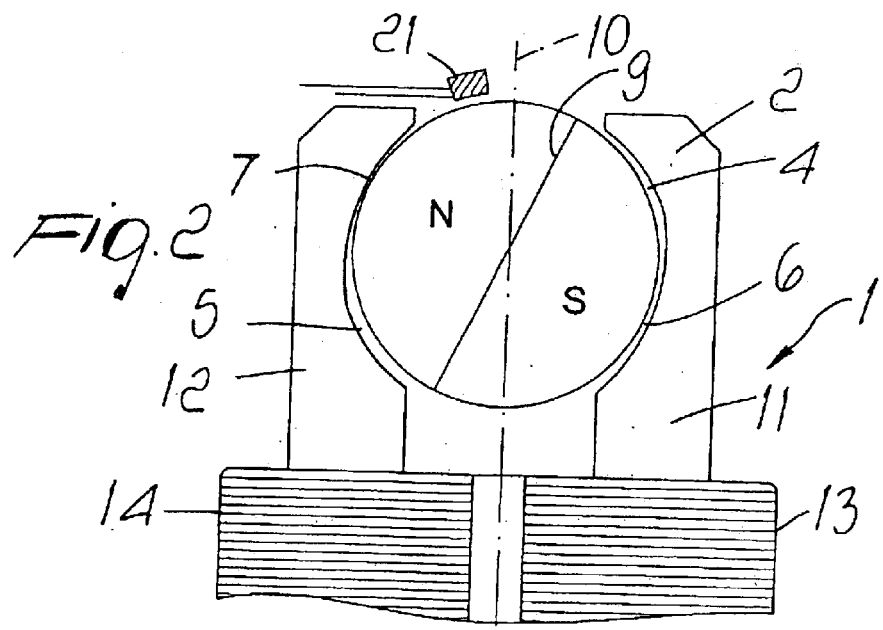
FIG. 2 is an enlarged-scale view of the rotor and of the poles of the motor of FIG. 1, further illustrating the position of a sensor for determining the angular position of the rotor and the polarity.

Equation A provides the exact position of the sensor means, $\Phi_{SH}$, which is the position determined mechanically as exemplified in FIG. 2.

During the starting of the synchronous motor, it is convenient to have the highest possible static phase margin $\Phi_{MO}$. This condition, once a rest angle of the rotor $\Phi_0$, has been set which depends on the geometry of the stator pole pieces, leads to the provision of the maximum placement angle of the sensor means 21, $\Phi_{SH}$, which is within the range of values given by the following formulas:

$$\Phi_0<\Phi_{SH}<(180+\Phi_0) \qquad \text{C)}$$

$$(\Phi R-\theta_L)<\Phi_{SH}<(180+\Phi_R-\theta_L) \qquad \text{D)}$$

where the first equation defines the limit of the starting angle, while the second equation defines the limit of the operating angle.

During synchronization, the phase margin for correct rotation is determined univocally by equation B; once the position of the rotor $\Phi_R$ at a given instant is determined, one finds that maximum values of $\Phi_{SH}$ comprised in the interval defined by equation C are associated with minimum load angle values of the rotor $\theta_L$, which correspond to low contrast loads, which is the opposite of what is sought. Therefore, the starting condition and the synchronous condition define an optimum value for $\Phi_{SH}$ that satisfies simultaneously equations C and D, such as to determine a signal 23 (which arrives from the sensor means 21) that is optimized for a given motor and a given load driven by said motor.

In practice it has been found that the electronic device for starting a permanent-magnet synchronous motor according to the present invention fully achieves the intended aim and objects, since it has a low cost, a simple structure, is stable over time and scarcely sensitive to operating temperature variations, and most of all does not have the phase shift network of the prior art.

Substantially, the device according to the present invention provides a mechanical phase shift, obtained by positioning appropriately the sensor means 21 with a placement angle that is in the interval of values determined by the above cited formulas C and D.

The device thus conceived is susceptible of numerous modifications and variations, all of which are within the scope of the inventive concept; all the details may further be replaced with other technically equivalent elements.

Where technical features mentioned in any claim are followed by reference signs, those reference signs have been included for the sole purpose of increasing the intelligibility of the claims and accordingly such reference signs do not have any limiting effect on the scope of each element identified by way of example by such reference signs.

What is claimed is:

1. An electronic device for starting a permanent-magnet synchronous motor including a stator having a central axis and a permanent-magnet rotor having a reference axis separating the north from the south pole, and comprising:

logic control means;

at least one switch arranged in series between an external power supply source and a permanent-magnet synchronous motor; and sensor means suitable to determine the polarity and position of the rotor of said motor, wherein said logic control means are suitable to provide a driving signal for said switch means as a function of a signal that arrives from said sensor means and a voltage signal of said external power supply source, and wherein said sensor means are arranged at an angular position $\Phi_{SH}$, the angle $\Phi_{SH}$ being determined so as to simultaneously satisfy the equations $$\Phi_0 < \Phi_{SH} < (180 + \Phi_0)$$

and $$(\Phi_R - \theta_L) < \Phi_{SH} < (180 + \Phi_R - \theta_L)$$

where $\Phi_0$ is the angle of the rotor reference axis to the central axis when the rotor is at rest, $\Phi_R$ is the angle of the rotor reference axis to the central axis during operation of said rotor at the zero crossing point of the voltage of said external power supply source, and $\theta_L$ is the phase shift between the voltage of said external power supply source and the current that circulates in the coils of the stator of said motor.

2. The device according to claim 1, wherein said sensor means are arranged, with respect to said central axis of the stator, in an angular position depending on the angle between the phase shift of the voltage of the power supply source and the current that circulates in the coils of said motor, said angle being termed load angle.

3. The device according to claim 2, wherein said sensor means are arranged, with respect to said permanent-magnet motor, so as to form a constant static phase margin, which is the angle between the position of said sensor means and the axis of the magnets of said motor when at rest.

4. The device according to claim 3, wherein said sensor means are arranged, with respect the rotor of said motor and said rest angle plus 180°.

5. The device according to claim 1, wherein said switch means comprise a static switch.

6. The device according to claim 1, wherein said logic control means perform an analog-to-digital conversion of said voltage signal of the power supply source and of said signal that arrives from said sensor means.

7. The device according to claim 1, wherein the position of said sensor means with respect to said central axis of the stator is optimized both for a starting condition of said motor and for a steady-state operating condition of said motor.

8. The device according to claim 1, wherein said sensor means comprise a Hall-effect sensor.

9. The device according to claim 1, wherein said power supply source is an AC power supply source.

10. The device according to claim 1, wherein said switch means comprise a triac.

11. An electronic device for starting a permanent-magnet synchronous motor including a stator having a central axis and a permanent-magnet rotor having a reference axis separating the north from the south pole, comprising:

at least one switch arranged in series between an external power supply source and the permanent-magnet synchronous motor;

sensor means for determining the polarity and position of the rotor of said motor;

logic control means to apply a driving signal to said switch means as a function of a first signal received from said sensor means and a second signal of said external power supply source;

wherein said sensor means are arranged at an angular position $\Phi_{SH}$, during the operation of said motor, with respect the central axis of the stator, wherein said angular position of the sensor means $\Phi_{SH}$ depends on the angle between phase shift of the power supply voltage and the current that circulates in the coils of the stator of said motor, and wherein said angular position of the sensor means $\Phi_{SH}$ is arranged, during the operation of said motor, and with respect to said reference axis of the rotor, such that the angle $\Phi_{SH}$ is determined so as to satisfy the equation $$(\Phi_R - \theta_L) < \Phi_{SH} < (180 + \Phi_R - \theta_L)$$

wherein $\Phi_R$ is the angle of the rotor reference axis to the central axis during operation of said rotor at the zero crossing point of the voltage of said external power supply source, and $\theta_L$ is the angle between phase shift of the power supply voltage and the current that circulates in the coils of the stator of said motor.

12. A device according to claim 11, wherein said angular position is determined for a given motor and a given load driven by said motor.

13. A device according to claim 11, wherein said sensor means are positioned on a lane surface perpendicular to the rotation axis of the rotor.

14. A device according to claim 11, wherein said sensor means are arranged, with respect to said central axis of the stator, so as to form a constant static phase margin, which is the angle between the position of said sensor means and the reference axis of the rotor when at rest.

15. A device according to claim 14, wherein said sensor means are arranged, with respect the rotor of said motor and said rest angle plus 180°.

16. A device according to claim 11, wherein said switch means comprise a static switch.

17. A device according to claim 11, wherein said logic control means perform an analog-to-digital conversion of said first signal received from said sensor means and of said second power supply voltage signal.

18. A device according to claim 11, wherein the position of said sensor means with respect to said central axis of the stator is optimized both for a starring condition of said motor and for a steady-state operating condition of said motor.

19. A device according to claim 11, wherein said sensor means comprise a Hall-effect sensor.

20. A device according to claim 11, wherein said power supply voltage source is an AC power supply source.

21. A device according to claim 11, wherein said switch means comprise a triac.

* * * * *

UNITED STATES PATENT AND TRADEMARK OFFICE
CERTIFICATE OF CORRECTION

PATENT NO. : 6,861,819 B2
APPLICATION NO. : 10/382015
DATED : March 1, 2005
INVENTOR(S) : Marioni It is certified that error appears in the above-identified patent and that said Letters Patent is hereby corrected as shown below:

Column 3, line 16, replace "w ere" with --were--

Column 6, line 5, insert --to-- after "respect"

Column 6, line 38, insert --to-- after "respect"

Column 7, line 2, insert --to-- after "respect"

Column 8, line 1 replace "starring" with --starting--

Signed and Sealed this

Nineteenth Day of September, 2006

JON W. DUDAS
*Director of the United States Patent and Trademark Office*